(12) United States Patent
St. Pierre

(10) Patent No.: US 11,451,582 B2
(45) Date of Patent: Sep. 20, 2022

(54) DETECTING MALICIOUS PACKETS IN EDGE NETWORK DEVICES

(71) Applicant: Arbor Networks, Inc., Westford, MA (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 252 days.

(21) Appl. No.: 16/850,903

(22) Filed: Apr. 16, 2020

(65) Prior Publication Data

US 2021/0120032 A1    Apr. 22, 2021

Related U.S. Application Data

(60) Provisional application No. 62/915,982, filed on Oct. 16, 2019.

(51) Int. Cl.
*H04L 9/40* (2022.01)

(52) U.S. Cl.
CPC ...... *H04L 63/1458* (2013.01); *H04L 63/1416* (2013.01); *H04L 63/1425* (2013.01)

(58) Field of Classification Search
CPC ............. H04L 63/1458; H04L 63/1416; H04L 63/1425
See application file for complete search history.

(56) References Cited

U.S. PATENT DOCUMENTS

| | | | |
|---|---|---|---|
| 9,762,610 B1 * | 9/2017 | Kwan | H04L 63/20 |
| 10,516,694 B1 * | 12/2019 | Gupta | H04L 63/1416 |
| 10,547,636 B2 * | 1/2020 | Wessels | H04L 63/0236 |
| 11,005,865 B2 * | 5/2021 | Compton | H04L 63/1458 |
| 11,153,342 B2 * | 10/2021 | Adams | H04L 63/1425 |
| 2013/0291107 A1 * | 10/2013 | Marek | G06F 21/552 726/22 |
| 2018/0054458 A1 * | 2/2018 | Marek | H04L 63/1458 |
| 2018/0183830 A1 * | 6/2018 | Wessels | H04L 63/0236 |
| 2018/0205750 A1 * | 7/2018 | Kohout | G06F 21/554 |
| 2019/0014084 A1 * | 1/2019 | Jain | H04L 63/1441 |
| 2019/0068626 A1 * | 2/2019 | Compton | H04L 63/1425 |
| 2020/0137112 A1 * | 4/2020 | Compton | H04L 63/1491 |
| 2020/0153863 A1 * | 5/2020 | Wiener | H04L 63/20 |
| 2020/0177625 A1 * | 6/2020 | Rouvinen | H04L 63/1425 |
| 2020/0177626 A1 * | 6/2020 | Wichtlhuber | H04L 63/1441 |

(Continued)

*Primary Examiner* — Joseph P Hirl
*Assistant Examiner* — Stephen T Gundry
(74) *Attorney, Agent, or Firm* — Locke Lord LLP; Scott D. Wofsy; Christopher J. Capelli

(57) ABSTRACT

Detecting a Denial of Service (DoS) attack in a network by a network edge router device whereby network traffic flows from the edge router to a core router in the network. Storing DoS attack traffic information in storage associated with the edge router which receives network traffic. Determining in the edge router if a portion of the received network traffic matches at least a portion of the stored DoS attack information. Determining in the edge router an alert condition exists if a portion of the received network traffic is determined to match at least a portion of the stored DoS attack information. Send an alert signal from the edge router to an attack mitigation device if it is determined an alert condition exists causing the attack mitigation device to transition to a mitigation state for mitigating effects of a DoS attack upon the network.

19 Claims, 4 Drawing Sheets

(56) References Cited

U.S. PATENT DOCUMENTS

| | | | |
|---|---|---|---|
| 2020/0204580 A1* | 6/2020 | Konda | H04L 63/1458 |
| 2020/0228538 A1* | 7/2020 | Soule | H04L 63/105 |
| 2020/0259860 A1* | 8/2020 | Adams | H04L 63/1408 |
| 2020/0382540 A1* | 12/2020 | Iekel-Johnson | H04L 63/0263 |
| 2021/0105300 A1* | 4/2021 | Garnett | H04L 63/0236 |
| 2021/0112091 A1* | 4/2021 | Compton | H04L 63/1425 |

* cited by examiner

DETECTING MALICIOUS PACKETS IN EDGE NETWORK DEVICES

CROSS REFERENCE TO RELATED APPLICATIONS

This application claims priority to U.S. Patent Application Ser. No. 62/915,982 filed Oct. 16, 2019 which is incorporated herein by reference in its entirety.

FIELD OF THE INVENTION

The disclosed embodiments generally relate to the detection and prevention of malicious attacks over computer networks and, more particularly, to the detection of network attacks by network edge devices.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either half-open TCP connections or fully open idle connections); and Vulnerability Exploit Attacks (e.g., attacks designed to exploit a vulnerability in a victim's operating system).

The architecture of the Internet makes networks and network devices vulnerable to the growing problems of DDoS attacks. Therefore, the ability to avoid or mitigate the damages of a DDoS attack, while preventing blocking of valid hosts, is advantageous to devices located in a protected network. It is to be appreciated that current approaches for thwarting DDoS attacks collect significant coarse-grained traffic statistics and as such do not allow precise knowledge of an incoming attack type. They also tend to rely on sampling of statistics and thus have a built-in latency to the detection. Additionally, they require that a system external to the routers makes a decision to send new configuration to the routers in order to mitigate an attack.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for detecting a denial of service attack in a network by a network edge router device whereby network traffic flows from the edge router to a core router in the network is discussed. Denial of service attack traffic information is stored in storage associated with the edge router which receives network traffic. A determination is then made in the edge router if a portion of the received network traffic matches at least a portion of the stored denial of service attack information and if an alert condition exists if a portion of the received network traffic is determined to match at least a portion of the stored denial of service attack information. Next, an alert signal is sent from the edge router to an attack mitigation device if it is determined an alert condition exists causing the attack mitigation device to transition to a mitigation state for mitigating effects of a denial of service attack upon the network.

Additionally, and in accordance with certain illustrated embodiments, a counter is incremented in the edge router when a portion of the received network traffic is determined to match at least a portion of the stored DoS attack information and a determination is made as to whether the incremented counter value exceeds a predetermined threshold counter value within a prescribed period of time. If yes (predetermined threshold counter value exceeded), then traffic policer is applied in the edge router operable to determine if a traffic rate for the received traffic exceeds a predetermined threshold rate. If yes (predetermined traffic rate exceeded), then the traffic rate for the received traffic may be limited to mitigate a DoS attack, in addition to other possible mitigation actions.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
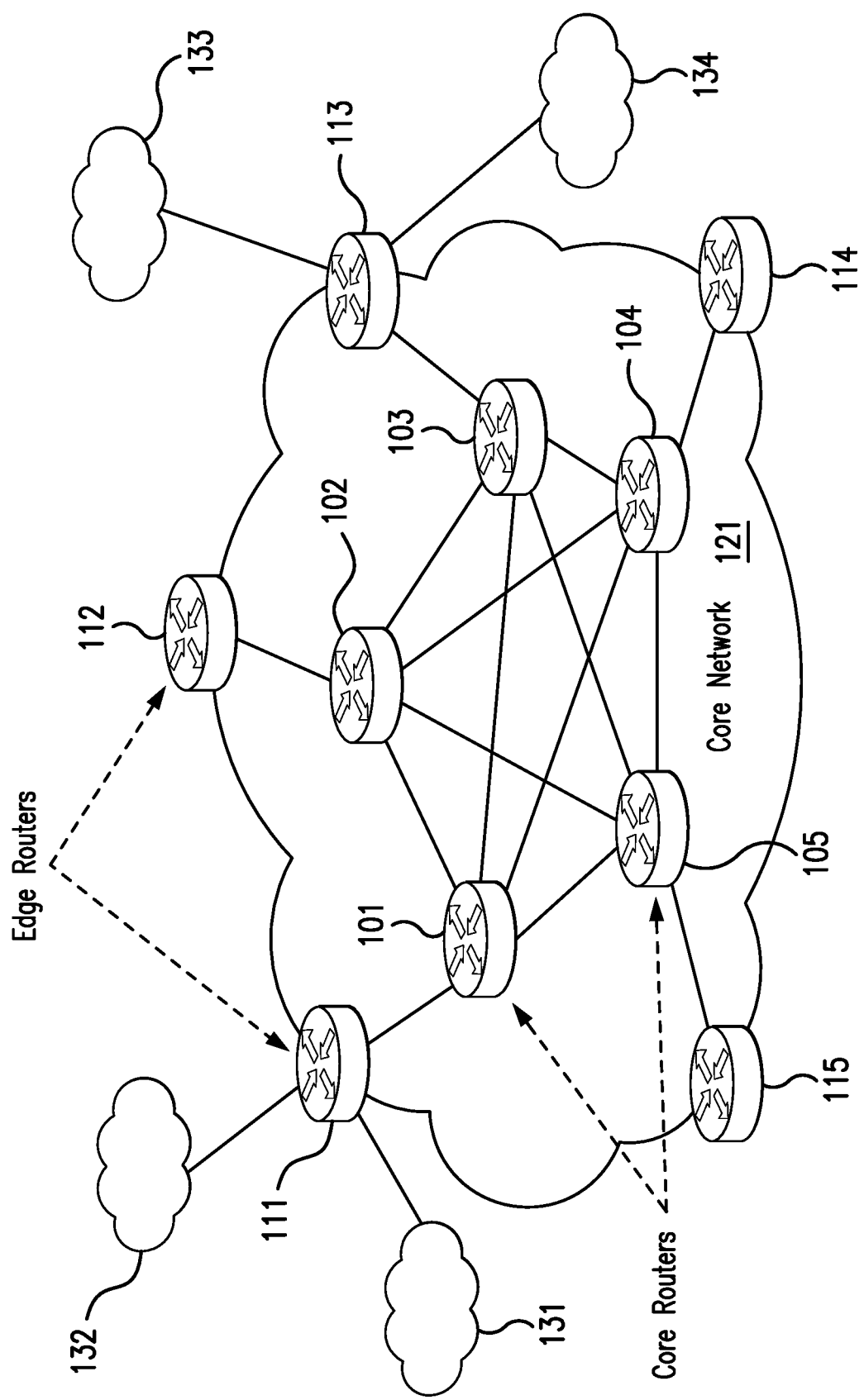
FIG. 1 is a schematic diagram illustrating a general structure of an ISP network wherein the system and method of the illustrated embodiments generally may be utilized.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack on a computer system/device or network.

Turning now descriptively to the drawings, in which similar reference characters denote similar elements throughout the several views, FIG. 1 illustrates a general structure of an ISP network wherein the system and method of the illustrated embodiments generally may be utilized (but are not to be limited thereto). The ISP network in FIG. 1 is preferably composed of two types of IP routers: core routers 101-105 and edge routers 111-115. The core routers interconnect with one another to form a core network 121, which is responsible for exchanging data for defined networks, such as protected network 200, described below. By contrast, edge routers are responsible for connecting external networks 131-134 with the core network 121.

Figure 2:
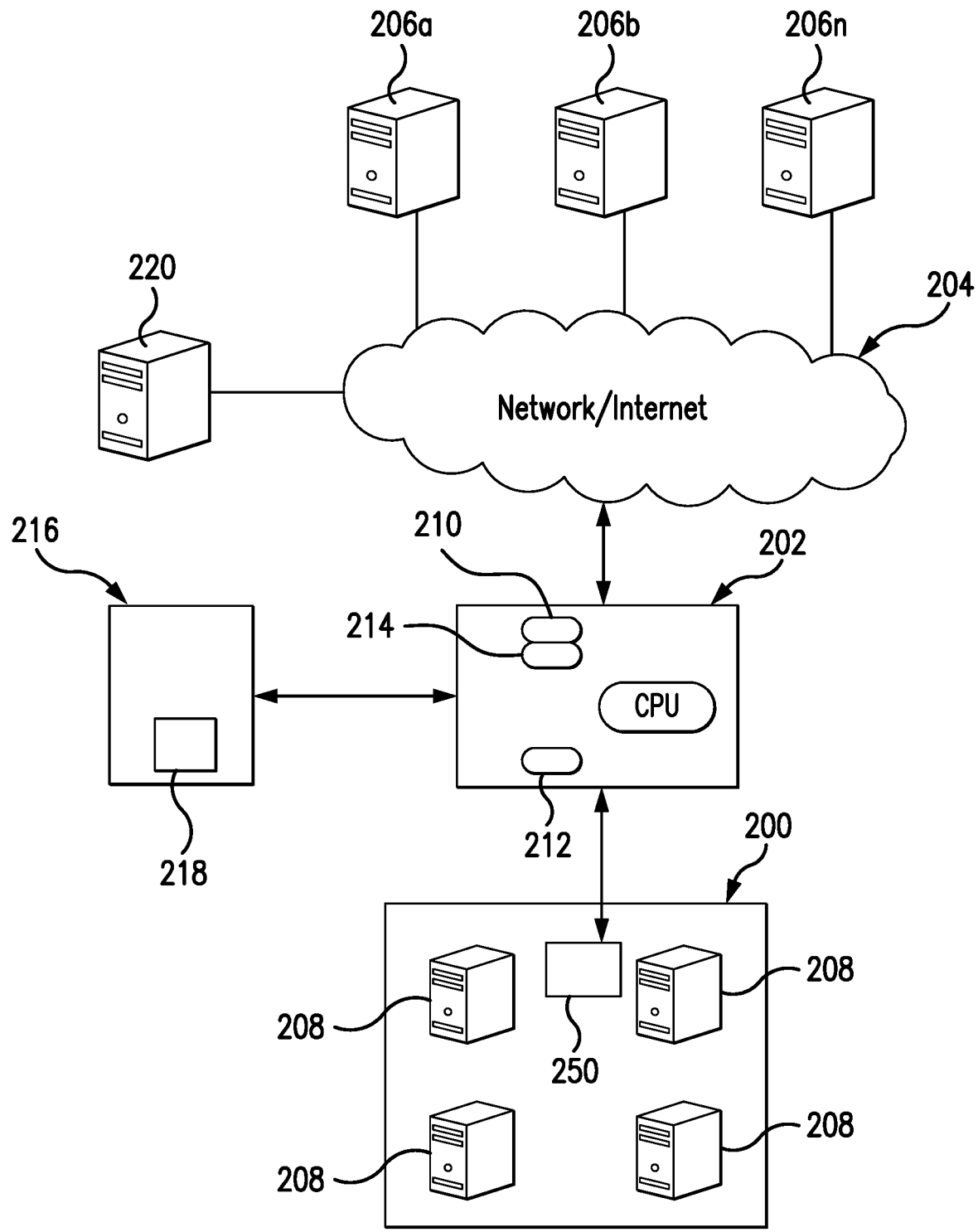
FIG. 2 is a schematic gram showing network architecture and the relationship between an edge router device and a protected network according to the illustrated embodiments.

With the general structure of an ISP network described above (FIG. 1), reference is now made to FIG. 2 illustrating the relationship between an edge router device 202, core router device 250, protected network 200, Internet 204, and external host devices 206a-206n, 220.

In a typical implementation, the external host devices 206a-206n, 220 (also referred to as external devices or host devices) attempt to connect to protected devices 208 within the protected network 200 typically via a private network or a public computer network such as the Internet 204. Examples of external host devices include servers, laptops, desktop computers, tablet devices, mobile phones, mobile computing devices, video games systems, televisions and other similar devices and systems having Internet connectivity.

In a preferred embodiment, the protected network 200 is protected by the edge router device 202 and network management system 216, preferably located between the Internet 204 and a core router device 250 coupled to a protected network 200. Usually, the protected network 200 is an enterprise network, such as a school network, business network, and government network, to list a few examples.

The edge router device 202 preferably includes a packet processing system preferably having an external high-speed network interface 210 and a protected high-speed network interface 212 and a storage device 214. Under current technology, these interfaces are capable of handling 1.0-100 Gbps, for example. The edge router device 202 may further include processors that preferably process the packets received at interfaces 210 and 212. Coupled to the edge router device 202 is a network management system 216 which also is understood to include computer resources necessary to carry out the functionality of the illustrated embodiments as described herein.

Figure 3:
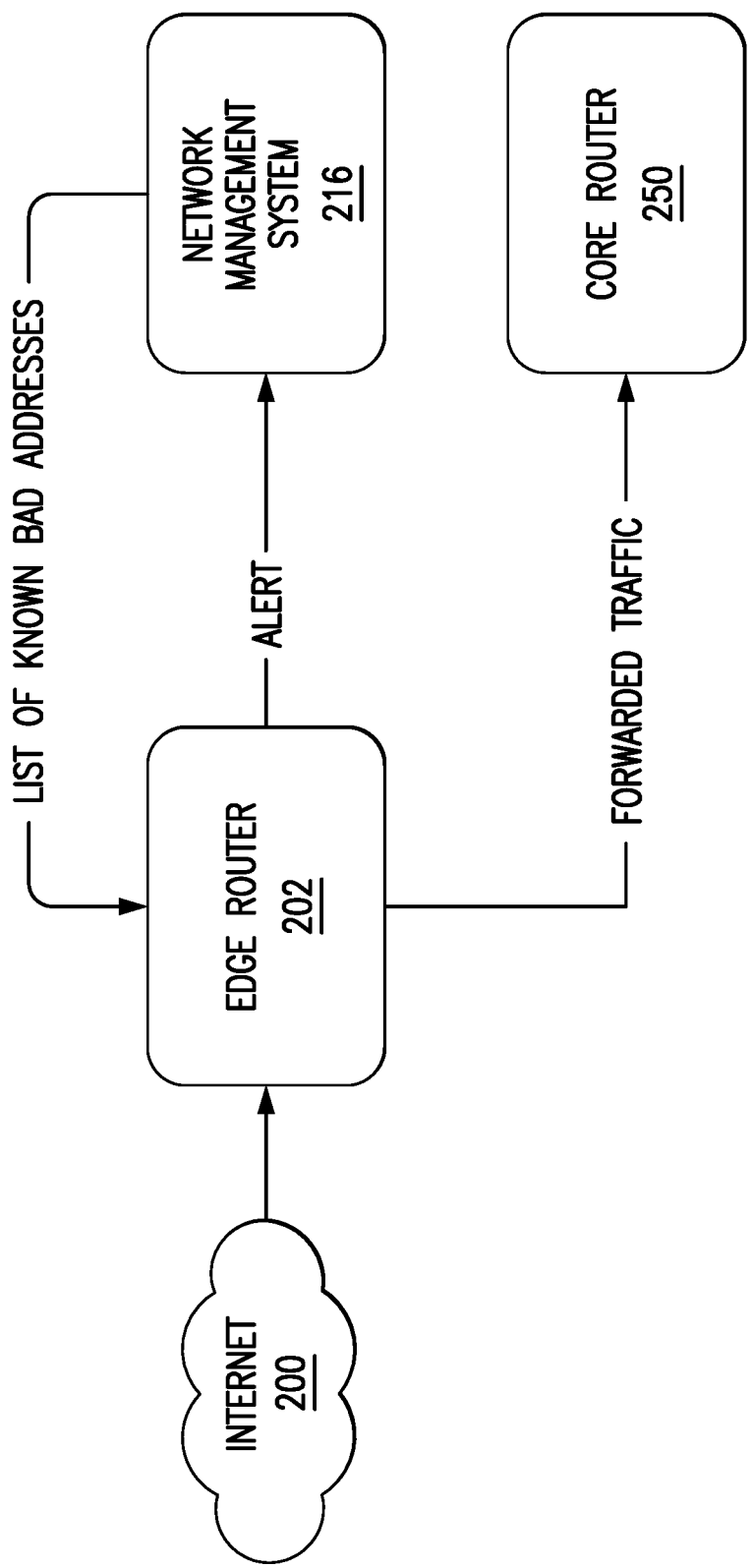
FIG. 3 is a schematic diagram showing the functional relationship between an edge router device, a network management system and a core router of FIG. 2 according to the illustrated embodiments.

With reference now to FIG. 3, description of the edge router 202 and network management system 216, in accordance with the illustrated embodiments is now provided.

The edge router 202 is preferably populated with a list of known bad addresses, or other information denoting malicious known sources of attack (e.g., 5-tuples (IP protocol, source address, destination address, source port, destination port), etc.) preferably enabling precise alerting on, for instance, an NTP-based attack vs. a DNS-based attack ("attack traffic information"), from the network management system 216. The aforesaid attack traffic information is preferably stored in storage device 214 associated with edge router 202. It is to be appreciated that the denial of service attack traffic information is provided to the network management system 216 preferably via an external process. Additionally, the network management system 216 preferably periodically updates the denial of service attack traffic information stored in the storage 214 of edge router 202.

Upon receipt of the aforesaid attack information, the edge router 202 preferably populates an associated storage table 214, such as in an Application-Specific Integrated Circuit (ASIC). As described in further detail below, when the edge router 202 detects that an arriving packet (e.g., from internet 200) is from an address associated with attack traffic information with reference to storage device 214, it is preferably configured and operable to: 1) increment a counter associated with the address; and 2) apply rate policer to traffic associated with that address based upon the counter value (as described below). And 3), in the event the aforesaid rate policer applied to the edge router 202 exceeds a configured threshold limit for at least a portion of received network traffic, the edge router 202 preferably transmits an alert message to the network management system 250. Similarly, if a management processor associated with the edge router 202 router performs a periodic check of its counters and determines that one of them has exceeded a predefined value within a prescribed time period, then the edge router 202 transmits an alert message to the network management system 216. Upon receipt of an alert message transmitted from the edge router 202, the network management system 216 preferably initiates one or more mitigation actions to thwart a possible attack on network 200 by the suspected attack traffic information. Thus, it is to be appreciated that the edge router 202 is configured and operable to send a signal (e.g., an alert message) to the network management system 216, causing a change in state of the network management system 216 (e.g., causes initiation of one or more actions for preventing attack on network 200, including dropping traffic associated with the suspicious ip address stored in a storage table of storage device 214 associated with the edge router 202).

In accordance with further illustrated embodiments, it is to be appreciated that the aforesaid storage table of the storage device 214 associated with the edge device 202 may further be prepopulated with rate limits such that the edge router 202 (preferably via its hardware), in addition to detection, it is additionally configured and operable to perform "shaping" upon at least a portion of the received network traffic when a traffic flow rate is exceeded for a portion of the received traffic determined associated with a suspected attack traffic as stored in the storage device 214. Hence, edge router 202 enables an immediate mitigation of a network attack prior to notification of the network management system 216, which is preferably configured to initiate additional mitigation actions.

Figure 4:
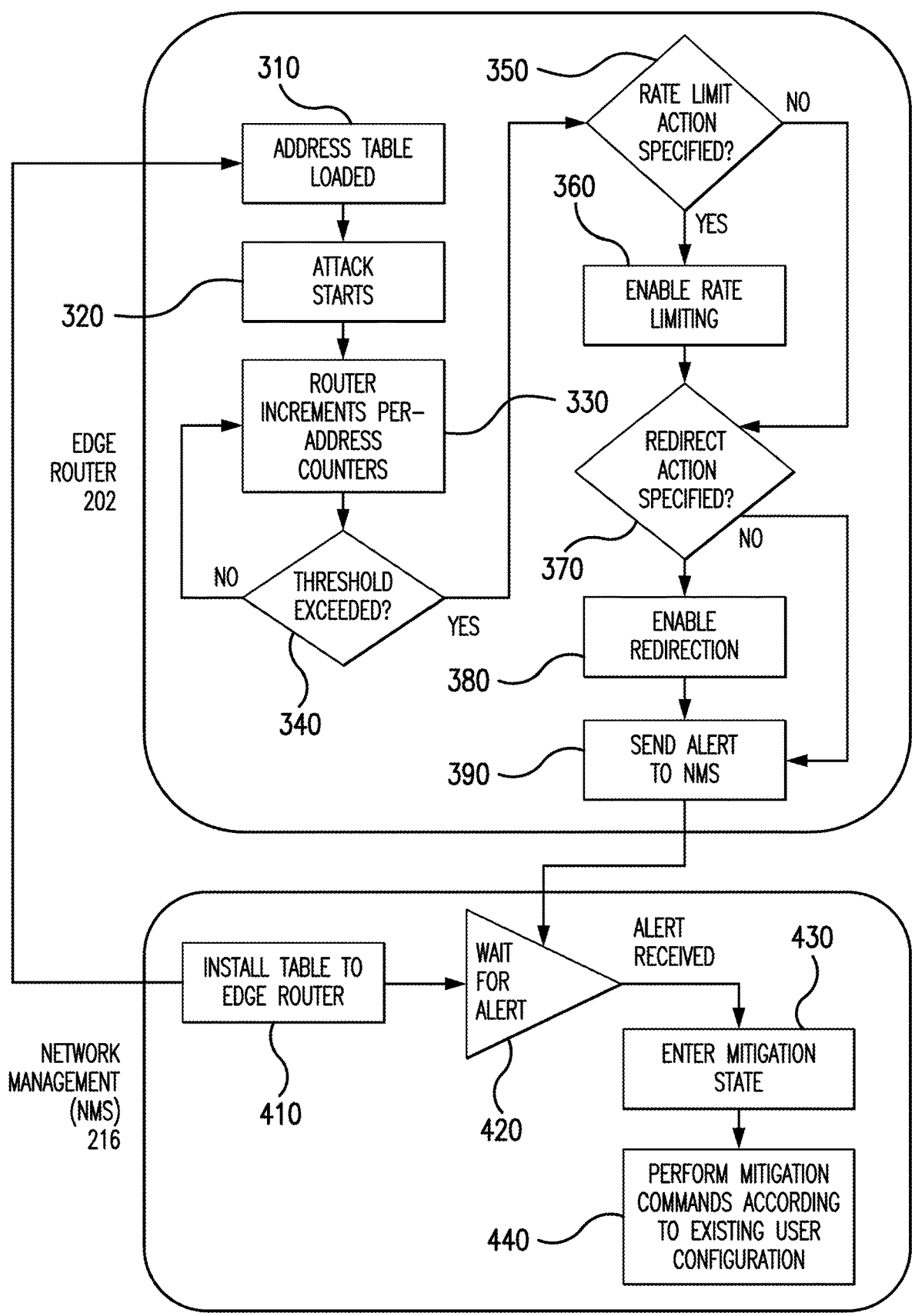
FIG. 4 is a flowchart illustrating operation of the devices of FIG. 3 according to the illustrated embodiments.

With reference now to FIG. 4 (and with continuing reference to FIGS. 2 and 3) a method of operation for edge router 202 and network management system 216 will now be discussed in accordance with the illustrated embodiments. Starting at step 310, the network management system 216 preferably sends (and/or updates) the edge router 202 with the aforesaid suspected denial of service attack information (e.g., ip addresses associated with malicious traffic), which is subsequently stored in storage device 214 (e.g., a table) associated with edge router 202. It is to be understood as traffic from network 204 flows through edge router 202, the edge router 202 is configured and operable to determine if there is a match between at least a portion of the traffic flowing through it and with that of the aforesaid stored suspected attack information (e.g., is there a match between ip addresses in the traffic received from network 204 with ip addresses in the stored attack data). If yes, then the edge router 202 is operable to determine that a possible network attack of the protected network 202 is underway (step 320). The edge router 202 is then configured to increment an address counter associated with the detected attack ip address (step 330). A determination is then made as to whether incrementing that counter has caused a threshold value associated with that counter to be exceeded within a prescribed time period (step 340). It is to be appreciated this may encompass comparing the counter value to the counter value at a previous point in time in order to calculate a traffic rate.

If yes, incrementing that counter has caused a threshold value associated with that counter to be exceeded within a predetermined time period (step 340), then a traffic policer is preferably applied to the edge router 202 to determine whether the traffic flow rate of the suspected attack traffic (step 320) exceeds a predetermined threshold value (step 350). If yes, and in accordance with certain illustrated embodiments, then the edge router 202 is configured and operable to limit the flow rate amount of traffic associated with the suspected ip attack traffic (e.g., the traffic regarding an ip address associated with a suspected DoS attack)(step 360), so as to mitigate a network attack upon protected network 200 prior to notification of the network management system 216, as mentioned above.

Conversely if it is determined that a defined rate limit for traffic associated with the suspected attack ip address has not been exceeded (step 350), then the process proceeds to step 370 to determine if redirect of the portion of traffic determined associated with the suspected ip address (e.g., sending the suspected attack traffic to a DDoS mitigation device or collection of such devices known as a "scrubbing center") is to be carried out by the edge device (step 380). Thus, the edge device 202, in accordance with certain illustrated embodiments, is further configurable and operable to redirect suspect attack traffic (step 380) (e.g., forward for deeper inspection) to further mitigate a network attack upon protected network 200 prior to notification of the network management system 216, as mentioned above.

If no action is prescribed in edge router 202 for redirecting suspected attack traffic, then the process proceeds to step 390 in which the edge router 202 is configured and operable to send an alert message to its coupled network management device 216 indicating receipt of traffic from network 204 that is associated with suspected attack traffic as provided to the edge router 202 by the network management device 216 (step 310).

Upon the network management device's 216 receipt of the aforesaid alert message transmitted from the edge device 202 (step 420), the network management device 216 then is operable to change its operational state so as to transition to an attack mitigation state (430). Once triggered to be in an attack mitigation state, the network management device 216 is operable to perform defined mitigation actions on the suspected attack traffic flowing from edge router 202 to a coupled core router 250 to thwart possible attack upon a protected network 200 coupled to the core router 250. It is to be appreciated such mitigation actions which may be performed may include, but are not limited to, rate-limiting the traffic, discarding packets from the traffic (either randomly or in some defined manner), and/or performing deep packet inspection (DPI) on all or a subset of the packets constituting the malicious traffic flow.

With the illustrated embodiments discussed above, it is to be appreciated the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer method for detecting a Denial of Service (DoS) attack in a network by a network edge router device whereby network traffic flows from the edge router to a core router in the network, comprising the steps:
   storing DoS attack traffic information in storage associated with the edge router;
   receiving network traffic in the edge router;
   determining in the edge router when a portion of the received network traffic matches at least a portion of the stored DoS attack information;
   determining in the edge router an alert condition exists when a portion of the received network traffic is determined to match at least a portion of the stored DoS attack information; and
   sending an alert signal from the edge router to an attack mitigation device when it is determined an alert condition exists causing the attack mitigation device to transition to a mitigation state for mitigating effects of a DoS attack upon the network.

2. The computer method as recited in claim 1, wherein a network management device sends the DoS attack traffic information to the edge router.

3. The computer method as recited in claim 2, wherein determining when an alert condition exists further includes:
   incrementing a counter in the edge router when it is determined a portion of the received network traffic matches at least a portion of the stored DoS attack information;
   determining when the counter exceeds a predetermined threshold value when incremented within a prescribed period of time; and
   applying a traffic policer in the edge router device when it is determined the counter exceeds a predetermined threshold value when incremented within the prescribed period of time.

4. The computer method as recited in claim 3, wherein determining when an alert condition exists further includes limiting the traffic rate for the received traffic when the traffic policer determined the portion of the received network traffic matching at least a portion of the stored DoS attack information exceeded a predetermined threshold rate.

5. The computer method as recited in claim 2, wherein determining when an alert condition exists further includes:
   incrementing a counter in the edge router associated with the portion of the received network traffic determined to match at least a portion of the stored DoS attack information;
   determining when the counter exceeds a predetermined threshold value when incremented within a prescribed period of time;
   applying a traffic policer in the edge router device when it is determined the counter exceeds a predetermined threshold value when incremented within the prescribed period of time; and
   determining when if a traffic rate for the received traffic exceeds a predetermined threshold rate in the traffic policer;
   transmitting the alert signal to the attack mitigation device when the counter exceeds a predetermined threshold value when incremented within the prescribed period of time and it is determined the traffic rate for the received traffic exceeds a predetermined threshold rate.

6. The computer method as recited in claim 5, further including limiting the traffic rate for the received traffic when the traffic policer determined the portion of the received network traffic matching at least a portion of the stored DoS attack information exceeded a predetermined threshold rate.

7. The computer method as recited in claim 3, further including, in the edge router, dropping at least a portion of the received traffic determined to match the stored attack information flowing from the edge router to the coupled core router when the counter exceeds a threshold value within the prescribed period of time.

8. The computer method as recited in claim 5, further including, in the edge router, dropping at least a portion of the received traffic determined to match the stored attack information flowing from the edge router to the coupled core router when the counter exceeds a threshold value within the prescribed period of time and the traffic rate for the received traffic is determined to exceed a predetermined threshold rate.

9. A network edge router apparatus for detecting a Denial of Service (DoS) attack in a network, comprising:
    a memory, coupled to the edge router, configured to store instructions;
    a processor, coupled to the edge router, disposed in communication with the memory, wherein said processor upon execution of the instructions is configured to:
    receive and store in the memory DoS attack traffic information from a coupled network management system;
    receive network traffic;
    determine if at least a portion of the received network traffic matches at least a portion of the stored DoS attack information;
    determine an alert condition exists if at least a portion of the received network traffic is determined to match at least a portion of the stored DoS attack information;
    send an alert signal if it is determined an alert condition exists to an attack mitigation device coupled in the network causing the attack mitigation device to transition to a mitigation state for mitigating effects of a DoS attack upon the network.

10. The network edge apparatus as recited in claim 9, wherein a network management device sends the DoS attack traffic information to the edge router.

11. The network edge apparatus as recited in claim 9, wherein determining if an alert condition exists further includes:
    incrementing a counter in the edge router when it is determined a portion of the received network traffic matches at least a portion of the stored DoS attack information;
    determining if the counter exceeds a predetermined threshold value when incremented within a prescribed period of time; and
    applying a traffic policer in the edge router device when it is determined the counter exceeds a predetermined threshold value when incremented within the prescribed period of time.

12. The network edge apparatus as recited in claim 11, wherein determining if an alert condition exists further includes limiting the traffic rate for the received traffic if the traffic policer determined the portion of the received network traffic matching at least a portion of the stored DoS attack information exceeded a predetermined threshold rate.

13. The network edge apparatus as recited in claim 9, wherein determining if an alert condition exists further includes:
    incrementing a counter in the edge router associated with the portion of the received network traffic determined to match at least a portion of the stored DoS attack information;
    determining if the counter exceeds a predetermined threshold value when incremented within a prescribed period of time;
    applying a traffic policer in the edge router device when it is determined the counter exceeds a predetermined threshold value when incremented within the prescribed period of time; and
    determining if a traffic rate for the received traffic exceeds a predetermined threshold rate in the traffic policer;
    transmitting the alert signal to the attack mitigation device when the counter exceeds a predetermined threshold value when incremented within the prescribed period of time and it is determined the traffic rate for the received traffic exceeds a predetermined threshold rate.

14. The network edge apparatus as recited in claim 13, further including limiting the traffic rate for the received traffic if the traffic policer determined the portion of the received network traffic matching at least a portion of the stored DoS attack information exceeded a predetermined threshold rate.

15. The network edge apparatus as recited in claim 11, further including dropping at least a portion of the received traffic determined to match the stored attack information flowing from the edge router to the coupled core router when the counter exceeds a threshold value within the prescribed period of time.

16. The network edge apparatus as recited in claim 13, further including, in the edge router, dropping at least a portion of the received traffic determined to match the stored attack information flowing from the edge router to the coupled core router when the counter exceeds a threshold value within the prescribed period of time and the traffic rate for the received traffic is determined to exceed a predetermined threshold rate.

17. A computer method for detecting a Denial of Service (DoS) attack in a network by a network edge router device whereby network traffic flows from the edge router to a core router in the network, comprising the steps:
    storing DoS attack traffic information in storage associated with the edge router;
    receiving network traffic in the edge router;
    determining in the edge router if a portion of the received network traffic matches at least a portion of the stored DoS attack information;
    determining in the edge router an alert condition exists if a portion of the received network traffic is determined to match at least a portion of the stored DoS attack information;
    incrementing a counter in the edge router associated with the portion of the received network traffic determined to match at least a portion of the stored DoS attack information;
    determining if the counter exceeds a predetermined threshold value when incremented within a prescribed period of time;
    applying a traffic policer in the edge router device when it is determined the counter exceeds a predetermined threshold value when incremented within the prescribed period of time;
    determining if a traffic rate for the received traffic exceeds a predetermined threshold rate in the traffic policer;
    transmitting the alert signal to the attack mitigation device when the counter exceeds a predetermined threshold value when incremented within the prescribed period of time and it is determined the traffic rate for the received traffic exceeds a predetermined threshold rate.

18. The computer method as recited in claim 17, further including, in the edge router, dropping at least a portion of the received traffic determined to match the stored attack information flowing from the edge router to the coupled core router when the counter exceeds a threshold value within the prescribed period of time and the traffic rate for the received traffic is determined to exceed a predetermined threshold rate.

19. The computer method as recited in claim 18, wherein a network management device sends the DoS attack traffic information to the edge router.

* * * * *